(12) United States Patent
Aleksyeyev

(10) Patent No.: US 9,442,831 B1
(45) Date of Patent: Sep. 13, 2016

(54) AUTOMATED TESTING OF PROGRAM CODE FOR PROCESSING A SIMPLE BOOT FLAG DATA STRUCTURE

(71) Applicant: American Megatrends, Inc., Norcross, GA (US)

(72) Inventor: Vyacheslav Aleksyeyev, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 51 days.

(21) Appl. No.: 13/774,803

(22) Filed: Feb. 22, 2013

(51) Int. Cl.
  *G06F 11/14* (2006.01)
  *G06F 11/22* (2006.01)
  *G06F 11/36* (2006.01)

(52) U.S. Cl.
  CPC ....... *G06F 11/3692* (2013.01); *G06F 11/2284* (2013.01); *G06F 11/1417* (2013.01); *G06F 11/2289* (2013.01); *G06F 11/3668* (2013.01)

(58) Field of Classification Search
  None
  See application file for complete search history.

(56) References Cited

U.S. PATENT DOCUMENTS

| | | | | |
|---|---|---|---|---|
| 6,189,114 B1 * | 2/2001 | Orr | ..................... | G06F 11/2284 713/2 |
| 6,393,586 B1 * | 5/2002 | Sloan | .................. | G06F 11/2284 713/1 |
| 6,640,316 B1 * | 10/2003 | Martin | ................ | G06F 11/1417 714/2 |
| 7,017,085 B2 * | 3/2006 | Braun | .......................... | 714/47.3 |
| 7,865,775 B2 * | 1/2011 | Yao et al. | ....................... | 714/36 |
| 8,078,856 B1 * | 12/2011 | Righi | .................. | G06F 11/2284 713/1 |
| 8,086,901 B2 * | 12/2011 | Song | ............................... | 714/36 |
| 8,612,800 B2 * | 12/2013 | Hendricks et al. | ............. | 714/15 |
| 2003/0226059 A1 * | 12/2003 | Braun | ............................. | 714/20 |
| 2006/0052997 A1 * | 3/2006 | Burns | .................. | G06F 11/3692 703/22 |
| 2009/0249120 A1 * | 10/2009 | Yao et al. | ........................ | 714/15 |
| 2011/0087920 A1 * | 4/2011 | Hendricks et al. | ............. | 714/21 |
| 2013/0166958 A1 * | 6/2013 | Lu | ........................ | G06F 11/2289 714/37 |
| 2014/0282434 A1 * | 9/2014 | Eilam | .................. | G06F 11/3688 717/131 |

OTHER PUBLICATIONS

Boot Time Script Commands, UltraDefrag Discussion, Aug. 2010, 7 pages, [retrieved on Feb. 16, 2016], Retrieved from the Internet: <URL:https://sourceforge.net/p/ultradefrag/discussion/709672/thread/3200deaf/>.*
Cooper, D., et al., BIOS Protection Guidelines, Special Publication 800-147, National Institute of Standards and Technology, Apr. 2011, 26 pages, [retrieved on May 12, 2016], Retrieved from the Internet: <URL:http://nvlpubs.nist.gov/nistpubs/Legacy/SP/nistspecialpublication800-147.pdf>.*
Web article: "Simple Boot Flag Specification Version 2.1", Jan. 28, 2005 [online][retrieved on: Feb. 22, 2013] retrieved from: http://msdn.microsoft.com/en-us/library/windows/hardware/gg463443.aspx 6 pps.

* cited by examiner

*Primary Examiner* — Thuy Dao
*Assistant Examiner* — Geoffrey St Leger
(74) *Attorney, Agent, or Firm* — Lee & Hayes, PLLC

(57) ABSTRACT

A computer is configured with a simple boot flag testing module. The simple boot flag testing module sets a simple boot flag data structure to a first value. The simple boot flag testing module then causes the computer to reboot. Following the reboot, the simple boot flag testing module determines if the value of the simple boot flag data structure is equivalent to a second value. If the value of the simple boot flag data structure is not equivalent to the second value following the reboot of the computer, the simple boot flag testing module stores data indicating that the test of the simple boot flag processing module with the first and second values has failed. This process may then be repeated for various combinations of first and second values. Once testing completes, the stored data may be used to present the results.

22 Claims, 6 Drawing Sheets

AUTOMATED TESTING OF PROGRAM CODE FOR PROCESSING A SIMPLE BOOT FLAG DATA STRUCTURE

BACKGROUND

Most computing devices utilize a firmware to control their low-level operation. The firmware is typically tied closely to the particular hardware components of the computing device. The firmware is generally stored in a non-volatile memory device, such as a read only memory ("ROM"), erasable programmable read only memory ("EPROM"), or a flash memory device. The firmware might be periodically updated in order to fix bugs or introduce new functionality.

In many types of computing devices, the firmware provides functionality for performing a power-on self-test ("POST") of the computing device, for booting the computing device (which might also be referred to as performing an initial program load ("IPL")), for providing interfaces to the low-level operation of the hardware of the computing device to an operating system executing on the computing device, and for performing other types of functions.

Many desktop, laptop, and server computers utilize a firmware known as a legacy Basic Input and Output System ("BIOS") firmware. Legacy BIOS includes low-level instruction code that is used as an intermediary between the hardware components of the computing system and the operating system and other high-level software executing on the computing system. For example, legacy BIOS might provide a set of software routines that allow high-level software to interact with the hardware components of the computing device using standard calls.

Other desktop, laptop, and server computers might utilize an Extensible Firmware Interface ("EFI")-based firmware, such as a firmware that is compatible with the Unified Extensible Firmware Interface ("UEFI") Specification from INTEL CORPORATION. Computing devices might also utilize the OPEN FIRMWARE specification from SUN MICROSYSTEMS or another type of open or proprietary firmware to control various aspects of their operation.

Legacy BIOS firmware and EFI-based firmware typically provide a simple boot flag register or variable (referred to herein as a "simple boot flag data structure") that can be used by an operating system to communicate boot options to the system firmware and add-in card option ROMs. This allows firmware and operating systems to automatically optimize their behavior and boot performance based on the installed operating system and the results of previous boots. For example, this mechanism might be utilized to determine when to run diagnostic tests during boot and/or to determine whether to configure hardware resources for devices. A Simple Boot Flag Specification has been published by MICROSOFT CORPORATION that describes aspects of the use and operation of the simple boot flag data structure described above.

Creating and testing program code that implements the Simple Boot Flag Specification in a firmware can be a complex and time consuming process. For example, previous mechanisms for testing firmware code that performs simple boot flag processing might take an hour or more to complete. The lengthy time required to test this program code can be frustrating for the engineers responsible for creating and testing the simple boot flag processing program code.

It is with respect to these and other considerations that the disclosure made herein is presented.

SUMMARY

Technologies are described herein for the automated testing of program code for processing a simple boot flag data structure. Through the utilization of the concepts and technologies presented herein, firmware program code utilized to implement a simple boot flag data structure, such as program code that implements the Simple Boot Flag Specification, can be tested in an automated fashion. This allows testing to be performed much more quickly than when previous manual testing methods are utilized.

According to one aspect presented herein, a computer system is provided that is equipped with a firmware, such as a legacy BIOS firmware or an EFI-based firmware. The firmware includes a simple boot flag processing module that implements the Simple Boot Flag Specification in one implementation disclosed herein.

As discussed above, the Simple Boot Flag Specification describes a simple boot flag data structure, which is a register in the case of legacy BIOS and a variable in the case of EFI-based firmware, that can be used by an operating system to communicate boot options to the firmware and add-in card option ROMs. This allows the firmware and operating systems to optimize their behavior and boot performance based on the installed operating system and the results of previous boots. For example, the simple boot flag data structure might be utilized to determine when to run diagnostic tests during boot and/or to determine whether to configure hardware resources for devices.

The computer system is also equipped with a simple boot flag testing module for testing the operation of the simple boot flag processing module. In order to test the operation of the simple boot flag processing module, the simple boot flag testing module is configured to set the simple boot flag data structure to a first value. The simple boot flag testing module is then configured to cause the computer system to reboot itself. Following the reboot of the computer, the simple boot flag testing module determines if the value of the simple boot flag data structure is equivalent to a second value.

If the value of the simple boot flag data structure is not equivalent to the second value following the reboot of the computer system, the simple boot flag testing module stores data indicating that the test of the simple boot flag processing module with the first and second values has failed. This process may then be repeated multiple times for various combinations of first and second values.

Once testing has been completed, the stored data may be utilized to generate a user interface that presents the results of the testing to a user of the computer system. The results of the testing might then be utilized to identify errors in the program code of the simple boot flag processing module.

It should be appreciated that the above-described subject matter may also be implemented as a computer-controlled apparatus, a computer process, a computing device or system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
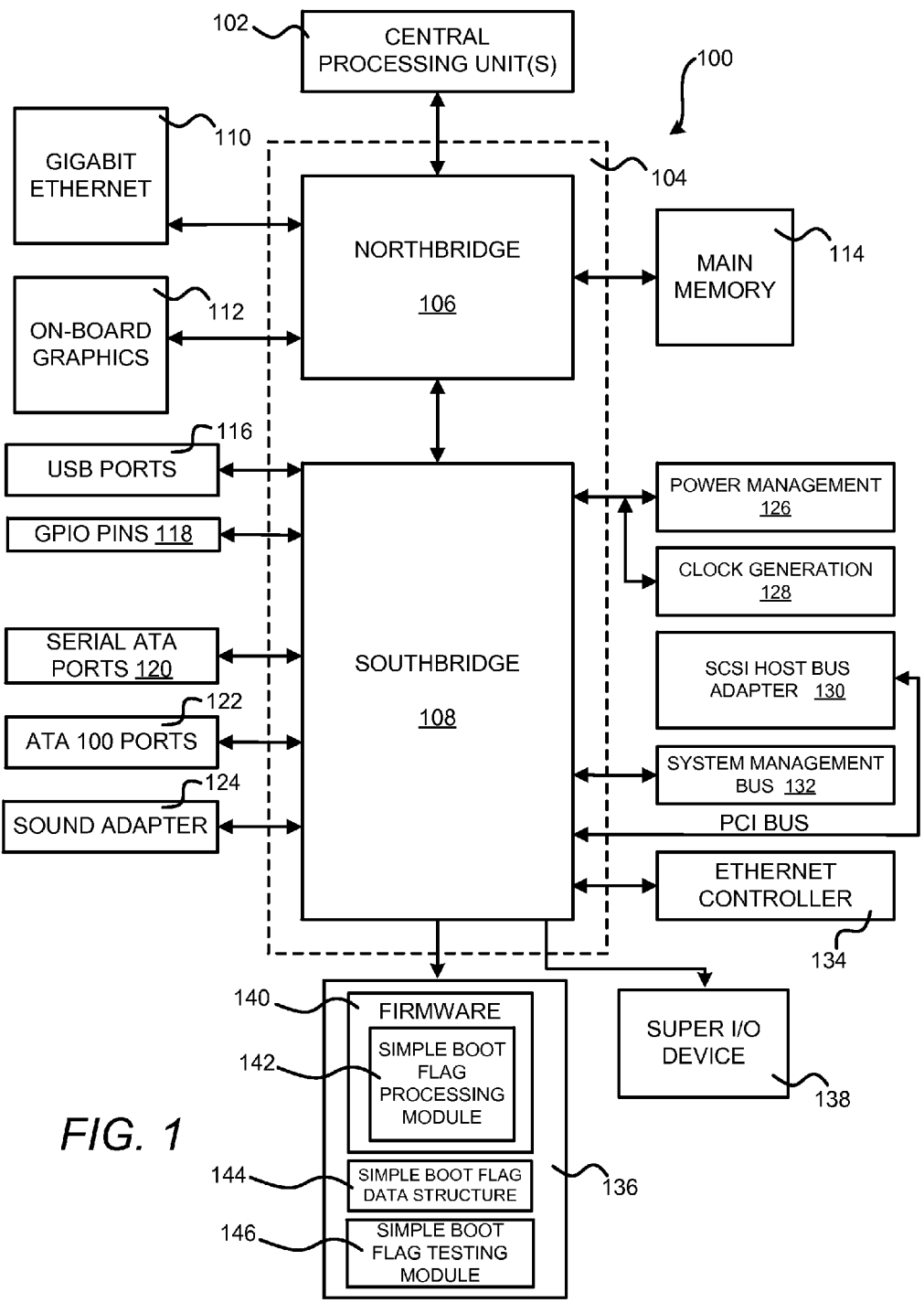
FIG. 1 is a computer architecture diagram that illustrates various components of a computing device that has been configured to provide the functionality disclosed herein for the automated testing of program code for processing a simple boot flag data structure.

Embodiments of the disclosure presented herein include methods, systems, apparatuses, devices, and computer-readable storage media for the automated testing of program code for processing a simple boot flag data structure. In the following detailed description, references are made to the accompanying drawings that form a part hereof, and in which are shown by way of illustration specific embodiments or examples. Referring now to the drawings, in which like numerals represent like elements throughout the several figures, aspects of various embodiments provided herein will be described.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like.

Turning now to FIG. 1, an illustrative computer architecture for practicing one or more of the embodiments discussed herein will be described. It should be appreciated that although the embodiments described herein are discussed in the context of a conventional desktop, laptop, or server computer, the embodiments may be utilized with virtually any type of computing device that utilizes a firmware to control aspects of its operation. For example, the embodiments disclosed herein might be utilized with smartphones, tablet computing devices, e-readers, set-top boxes, and other types of computing devices. These devices might be referred to herein as a "computer," a "computer system," or a "computing device." FIG. 1 shows an illustrative computer architecture for a computer 100 that is operative to provide the functionality described herein for the automated testing of program code for processing a simple boot flag data structure.

In order to provide the functionality described herein, the computer 100 can include a baseboard, or motherboard. The motherboard can be a printed circuit board to which some or all of the components shown in FIG. 1 may be connected by way of a system bus or other electrical communication path. In particular, in one illustrative embodiment, the motherboard includes one or more central processing units ("CPU") 102 configured to operate in conjunction with a chipset 104. The CPU 102 may be a standard central processor that performs arithmetic and logical operations necessary for the operation of the computer. For example, the CPU 102 might be a CPU available from INTEL CORPORATION, AMD CORPORATION, or a CPU based upon the ARM architecture from ARM HOLDINGS. Other types of CPUs might also be utilized.

The CPU 102 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

In one implementation, the chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the Ethernet adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a bus for interfacing peripheral card devices such as a SCSI host bus adapter 130. In one embodiment, the bus comprises a peripheral component interconnect ("PCI") bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices (not shown) storing an operating system and application programs. As known to those skilled in the art, an operating system comprises a program, or set of programs, that controls the operation of a computer. An application program is software that runs on top of the operating system software and uses computer resources made available through the operating system to perform application specific tasks desired by the user.

The mass storage devices connected to the southbridge 108 and the SCSI host bus adapter 130, and their associated computer-readable storage media, provide non-volatile storage for the computer 100. Although the description of computer-readable storage media contained herein refers to a mass storage device, such as a hard disk or CD-ROM drive, it should be appreciated by those skilled in the art that computer-storage media can be any available media that can be accessed by the computer 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of a semiconductor memory when the software or firmware is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computer 100 may participate within the overall systems or operating environments using the components, logic flows, and/or data structures discussed herein.

As shown in FIG. 1, a low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer-readable storage media such as a ROM, EPROM, or flash memory device 136. In the example shown in FIG. 1, a flash memory device 136 has been utilized. It should be appreciated that, in other embodiments, a ROM, EPROM, or other type of non-volatile memory device might also be utilized.

As also shown in FIG. 1, the flash memory device 136 might be configured to store a firmware 140. As described briefly above, the firmware 140 might provide functionality for performing a POST of the computer 100, for booting the computer 100, for providing interfaces to the low-level operation of the hardware of the computer 100 to an operating system executing on the computer 100, and for performing other types of functions. In various embodiments, the firmware might be a legacy BIOS firmware, a firmware that is compatible with the UEFI Specification, another type of EFI firmware, a firmware that is compatible with the OPEN FIRMWARE specification, or another type of firmware.

According to various embodiments disclosed herein, the firmware 140 may be configured to implement aspects of the Simple Boot Flag Specification, published by MICROSOFT CORPORATION. As mentioned above, the Simple Boot Flag Specification defines a simple boot flag data structure 144 that can be used by an operating system to communicate boot options to the system firmware 140 and add-in card option ROMs. This allows the firmware 144 and operating systems to automatically optimize their behavior and boot performance based on the installed operating system and the results of previous boots. For example, this mechanism might be utilized to determine when to run diagnostic tests during boot and/or to determine whether to configure hardware resources of the computer 100 for devices. The Simple Boot Flag Specification, Version 2.1, is incorporated by reference herein in its entirety.

When the firmware 140 is a legacy BIOS firmware, the simple boot flag data structure 144 is a register (which might be referred to as the "BOOT register") that is defined in a complementary metallic oxide semiconductor ("CMOS")

memory, which is typically accessed through I/O ports 70h/71h on platforms utilizing an INTEL CORPORATION architecture. The location of the BOOT register in CMOS is indicated by a BOOT table found via the Advanced Configuration and Power Interface ("ACPI") root system descriptor table ("RSDT") table.

When the firmware 140 is an EFI-based firmware, the simple boot flag data structure 144 is implemented as a global variable (named "SimpleBootFlag") that is available both during boot and runtime. In either the legacy BIOS or EFI-based firmware case, the operating system writes to the simple boot flag data structure 144, as appropriate, to set options for subsequent boots. The firmware 140 and, potentially, option ROM firmware, then read from the simple boot flag data structure 144 during POST to determine what actions to take.

It should be appreciated that, regardless of implementation, the simple boot flag data structure 144 provides a mechanism for an operating system to communicate back to the firmware 140 about what actions need to be taken on the next boot of the computer 100. If an EFI firmware 140 maintains a legacy BIOS for backwards compatibility, the EFI firmware 140 is responsible for maintaining congruency between the CMOS BOOT register and the EFI variable. All EFI-aware operating systems and EFI executables, such as drivers, applications, or option ROMs, should use the EFI SimpleBootFlag variable only. The format of the simple boot flag data structure 144 is described in detail below with regard to FIG. 2.

In one embodiment, the firmware 140 includes a simple boot flag processing module 142 that is configured to modify the simple boot flag data structure 144 according to the Simple Boot Flag Specification. When the firmware 140 is an EFI-based firmware, the simple boot flag processing module 142 might be implemented as an EFI module that reads and, potentially, modifies the simple boot flag data structure 144 during POST. The simple boot flag processing module 142 might also be a module in a legacy BIOS for performing this functionality.

As mentioned above, creating and testing program code, such as the simple boot flag processing module 142, that implements the Simple Boot Flag Specification in the firmware 140 can be a complex and time consuming process. For example, previous mechanisms for testing the operation of the simple boot flag processing module 142 might take an hour or more to complete. The lengthy time required to test this program code can be frustrating for the engineers responsible for creating and testing the simple boot flag processing program code.

The embodiments disclosed herein provide mechanisms for automated testing of the operation of the simple boot flag processing module 142. This functionality is embodied in a simple boot flag testing module 146 in one embodiment disclosed herein. When the firmware 140 is an EFI-based firmware, the simple boot flag testing module 146 might be implemented as an EFI application. When the firmware 140 is a legacy BIOS, the simple boot flag testing module 146 might be implemented as an MS-DOS program, a program that runs on the WINDOWS operating system or another operating system, or in another type of program. Other programs might be utilized to test the operation of the simple boot flag processing module 142 in other embodiments. Details regarding the operation of the simple boot flag testing module 146 will be provided below with regard to FIGS. 3A-3C and 4.

It should be appreciated that the computer 100 may comprise other types of computing devices, including handheld computers, embedded computer systems, personal digital assistants, table computing devices, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1. Additional details regarding the operation of the simple boot flag testing module 146 will be provided below with regard to FIGS. 2-4.

Figure 2:
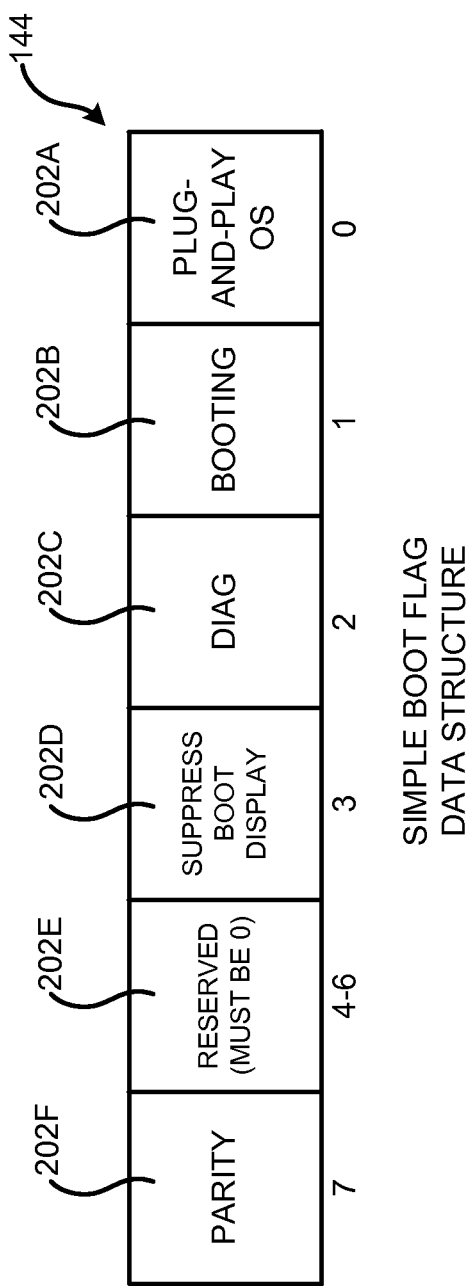
FIG. 2 is a data structure diagram showing the configuration of a simple boot flag data structure utilized in the embodiments disclosed herein.

FIG. 2 is a data structure diagram showing aspects of the configuration of the simple boot flag data structure 144, according to one embodiment disclosed herein. The simple boot flag data structure 144 is an eight-bit binary number in one embodiment disclosed herein. In this embodiment, each of the eight bits 202A-202F of the simple boot flag data structure 144 is utilized to provide a predefined indication. The configuration of the bits 202A-202F of the simple boot flag data structure 144 are the same regardless of whether the simple boot flag data structure 144 is implemented as a legacy BIOS register or an EFI variable. Details regarding the information carried by each of the eight bits 202A-202F of the simple boot flag data structure 144 are provided below.

Bit 202A of the simple boot flag data structure 144 indicates that a Plug-and-Play capable operating system is installed on the computer 100. The simple boot flag processing module 142 checks the state of bit 202A. If bit 202A is not set, the simple boot flag processing module 142 assumes that a legacy operating system is installed on the computer 100 (i.e. a non-Plug-and-Play capable operating system) and configures the resources of hardware devices that the firmware 140 controls. If bit 202A is set, the simple boot flag processing module 142 assumes that a Plug-and-Play operating system is being utilized and configures only those devices required for boot as per the Plug-and-Play PC98 specification.

Bit 202B of the simple boot flag data structure 144 indicates whether or not the previous boot of the computer 100 was not completed. The simple boot flag processing module 142 checks the state of this flag at the beginning of the POST of the computer 100. If bit 202B is set, the simple boot flag processing module 142 will set bit 202C, described below, to one to inform other components to run a diagnostic test on the computer 100. If bit 202B is not set, the simple boot flag processing module 142 will clear bit 202C to inform components to skip the diagnostic tests and to begin loading the boot sector. Bit 202B is set by the simple boot flag processing module 142 at the earliest possible moment of POST. This bit is cleared by the operating system executing on the computer 100 after it has completed its boot procedure.

Bit 202C indicates whether or not to run diagnostic tests on the computer 100. As described above, the simple boot flag processing module 142 sets the bit 202C based on the state of bit 202B at the beginning of POST, or by the operating system during the previous boot. If set at the beginning of POST, bit 202C must remain set to allow the operating system to request diagnostic boots. If set during POST, the system firmware 140, option ROMs, and operating systems should run diagnostic tests. If not set, these components must not run diagnostic tests and should boot the computer 100 as quickly as possible.

Bit 202D indicates whether or not the operating system loader in the firmware 140 should update a video display of the computer 100 after the POST has been completed. Bit 202D may be set by the simple boot flag processing module 142 at the beginning of POST. Optionally, this bit may be set by the simple boot flag processing module 142 in the S4 shutdown handler, and in this case should remain set during system POST. If set during POST, the operating system loader may choose not to alter the display output provided by the firmware 140 until program control has been transferred to the operating system. If this bit is set, the firmware 140 is responsible for setting the desired display image after POST, until the operating system boot or hibernate the operating system loader completes the resume process, and handoff to the operating system resume vector occurs.

Under some circumstances (e.g., error conditions), the operating system executing on the computer 100 may still need to provide status or error messages to a user, and so may opt to regain control of the display. If bit 202D is cleared during POST, the operating system loader is responsible for updating the display during read of the hibernate image off of the disk. The bit 202D is owned by the firmware 140, and not reset by the operating system. Bits 202E (i.e. bits four through six) of the simple boot flag data structure 144 are reserved. The values of these bits 202E must be zero.

Bit 202F is a parity bit that is used to check used to verify the integrity of the simple boot flag data structure 144. This bit is set with odd parity based on the contents of the remainder of the simple boot flag data structure 144. If the simple boot flag processing module 142 detects that bit 202F is not set correctly, the simple boot flag processing module 142 assumes that the simple boot flag data structure 144 is corrupted.

As discussed briefly above, and in greater detail below, the simple boot flag testing module 146 tests the operation of the simple boot flag processing module 142 for setting the various bits 202A-202F of the simple boot flag data structure 144. In order to test the operation of the simple boot flag processing module 142, the simple boot flag testing module 146 sets the bits 202A-202F to certain values described below. The simple boot flag testing module 146 then causes the computer 100 to reboot.

Once the computer 100 has rebooted, the simple boot flag testing module 146 reads the bits 202A-202F from the simple boot flag data structure 144 and compares the read values to certain expected values. If the actual values of the bits 202A-202F are not equivalent to the expected values for the bits 202A-202F, then the simple boot flag testing module 146 stores data indicating that the test has failed. This testing process might then be repeated for other values. Once all of the tests have been completed, the simple boot flag testing module 146 presents the results of the tests in a user interface. Additional details regarding these processes will be provided below with regard to FIGS. 3A-4.

Figure 3A:
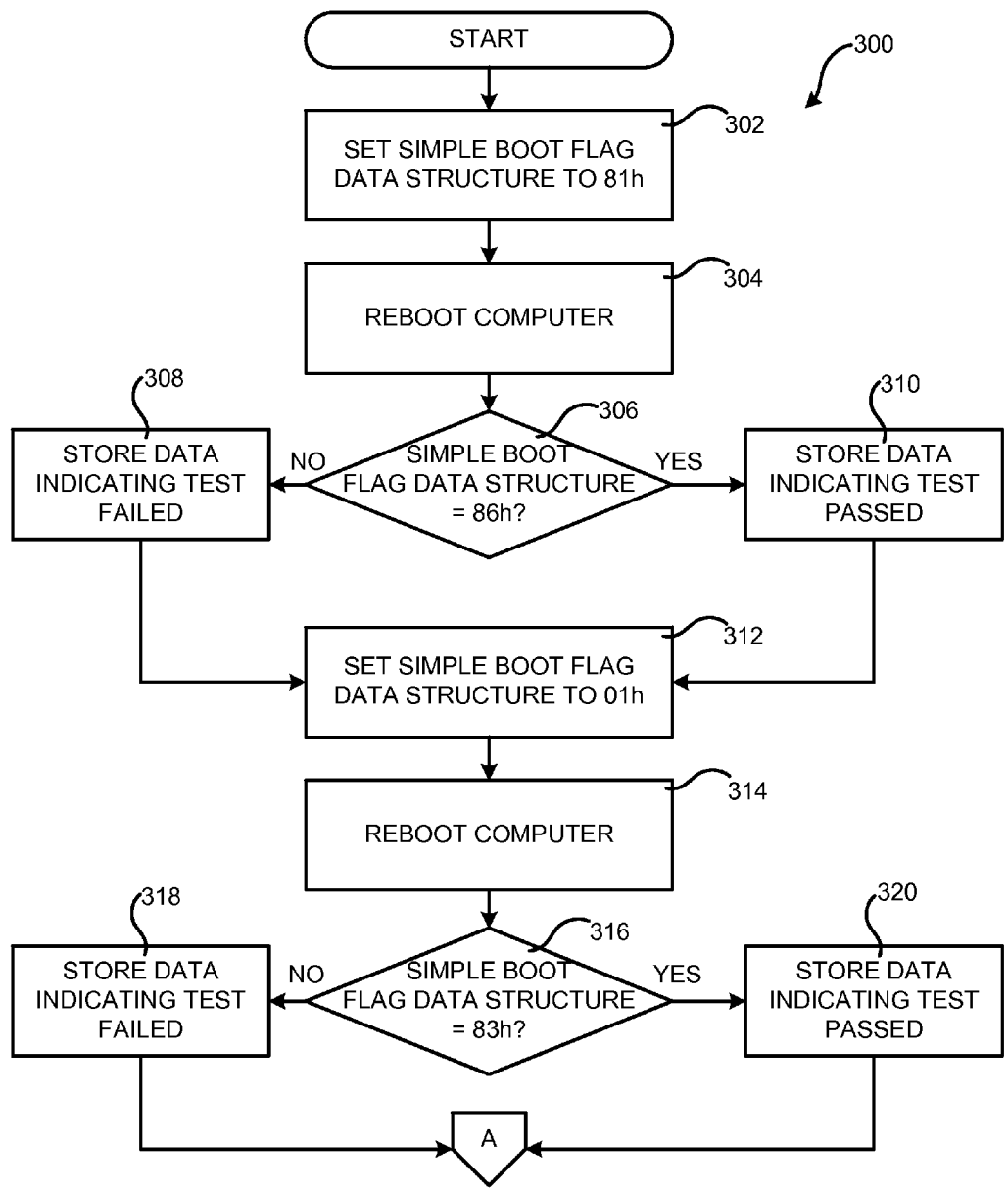
FIGS. 3A-3C are flow diagrams showing aspects of one routine disclosed herein for the automated testing of program code for processing a simple boot flag data structure, according to one embodiment disclosed herein.
Figure 3B:
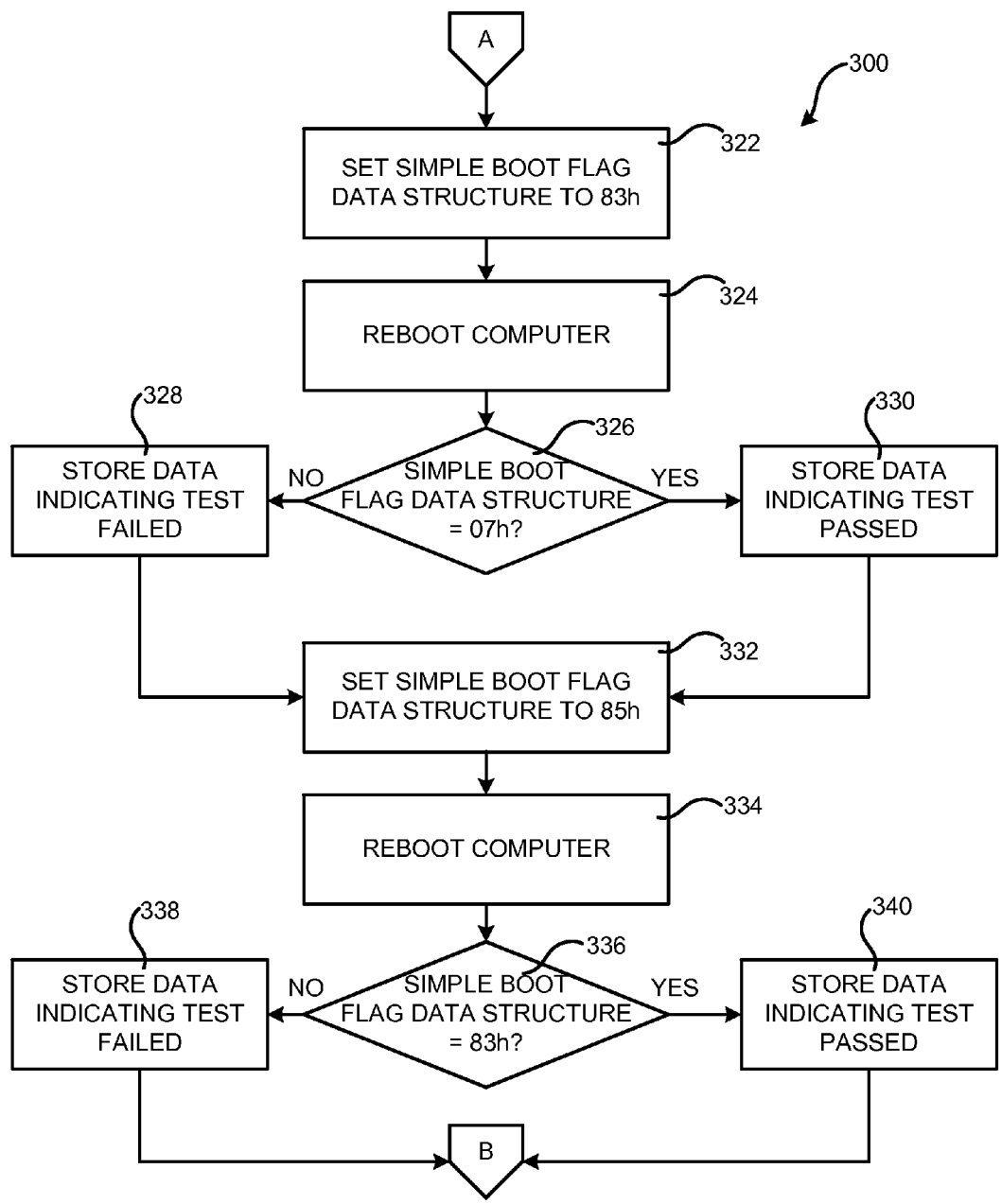
Figure 3C:
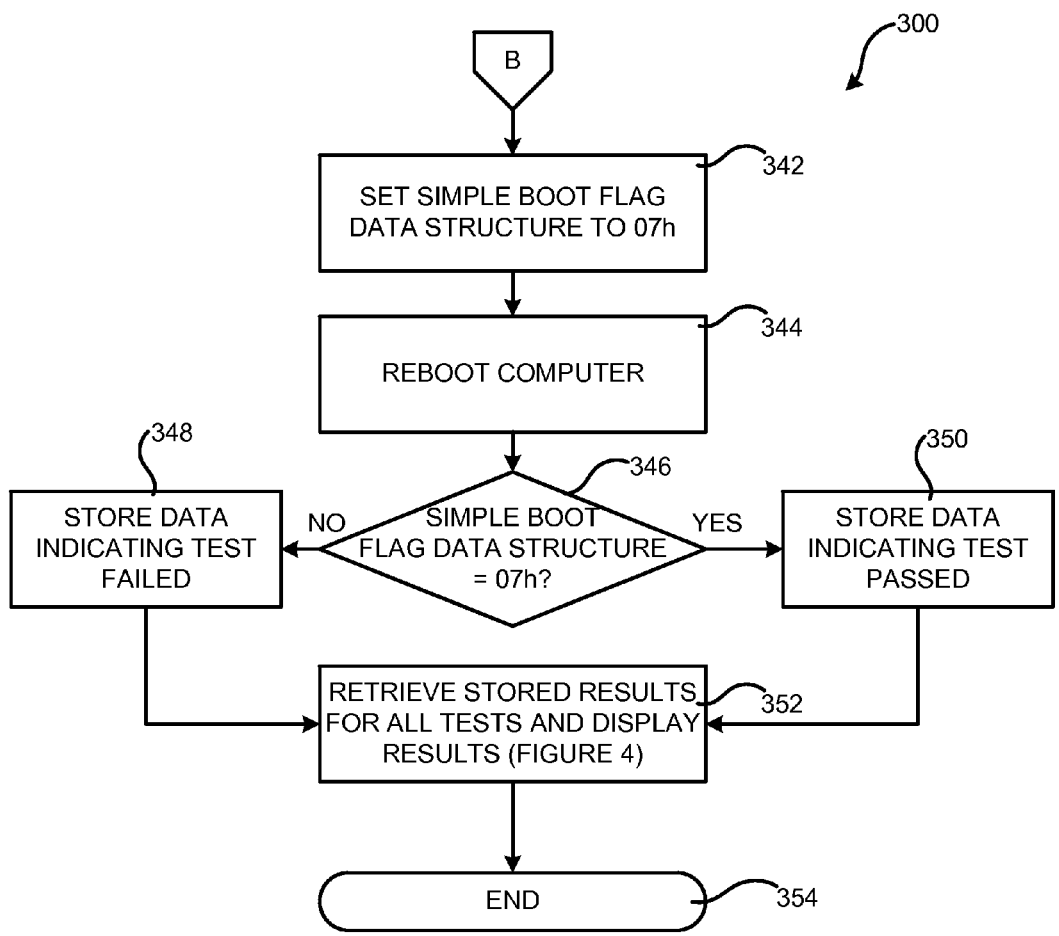

Turning now to FIGS. 3A-3C, additional details will be provided regarding the embodiments disclosed herein for the automated testing of program code, such as the simple boot flag processing module 142, for processing a simple boot flag data structure 144. In particular, FIGS. 3A-3C are flow diagrams showing aspects of one routine 300 disclosed herein for the automated testing of program code for processing a simple boot flag data structure 144, according to one embodiment disclosed herein. The process illustrated in FIGS. 3A-3C might be performed by the simple boot flag testing module 146, by program code in the firmware 142, by a DOS or WINDOWS application executing on an operating system on the computer 100, or by another component altogether.

It should be appreciated that the logical operations described herein with regard to FIGS. 3A-3C and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 begins at operation 302, where the simple boot flag testing module 146 sets the simple boot flag data structure to 81 hexadecimal (hereinafter "h") (binary 1000 0001). Setting the simple boot flag data structure to 81h allows the simple boot flag testing module 146 to test the functionality of the simple boot flag processing module 142 for handling the case where bit 202F indicates that the parity of the simple boot flag data structure is incorrect.

From operation 302, the routine 300 proceeds to operation 304, where the simple boot flag testing module 146 causes the computer 100 to reboot. Once the computer 100 has rebooted, the routine 300 proceeds to operation 306, where the simple boot flag testing module 146 reads the value of the simple boot flag data structure 144 and compares the read value to the value 86h (binary 1000 0110). If the read value of the simple boot flag data structure 144 is 86h, the routine 300 proceeds from operation 306 to operation 310, where the simple boot flag testing module 146 temporarily stores data indicating that the test has passed. If, however, the read value of the simple boot flag data structure 144 is any value other than 86h, the routine 300 proceeds from operation 306 to operation 308, where the simple boot flag testing module 146 temporarily stores data indicating that the test has failed. From operations 308 and 310, the routine 300 proceeds to operation 312.

At operation 312, the simple boot flag testing module 146 sets the simple boot flag data structure to 01h (binary 0000 0001). Setting the simple boot flag data structure to 01h allows the simple boot flag testing module 146 to test the functionality of the simple boot flag processing module 142 for handling the case where bit 202B of the simple boot flag data structure 144 indicates that the previous boot of the computer 100 was completed.

From operation 312, the routine 300 proceeds to operation 314, where the simple boot flag testing module 146 causes the computer 100 to reboot. Once the computer 100 has rebooted, the routine 300 proceeds to operation 316, where the simple boot flag testing module 146 reads the value of the simple boot flag data structure 144 and compares the read value to the value 83h (binary 1000 0011). If the read value of the simple boot flag data structure 144 is 83h, the routine 300 proceeds from operation 316 to operation 320, where the simple boot flag testing module 146 temporarily stores data indicating that this test has passed. If, however, the read value of the simple boot flag data structure 144 is any value other than 83h, the routine 300 proceeds from operation 316 to operation 318, where the simple boot flag testing module 146 temporarily stores data indicating that this test has failed. From operations 318 and 320, the routine 300 proceeds to operation 322.

At operation 322, the simple boot flag testing module 146 sets the simple boot flag data structure to 83h (binary 1000 0011). Setting the simple boot flag data structure to 83h allows the simple boot flag testing module 146 to test the functionality of the simple boot flag processing module 142 for handling the case where bit 202B of the simple boot flag data structure 144 indicates that the previous boot of the computer 100 was not completed.

From operation 322, the routine 300 proceeds to operation 324, where the simple boot flag testing module 146 causes the computer 100 to reboot. Once the computer 100 has rebooted, the routine 300 proceeds to operation 326, where the simple boot flag testing module 146 reads the value of the simple boot flag data structure 144 and compares the read value to the value 07h (binary 0000 0111). If the read value of the simple boot flag data structure 144 is 07h, the routine 300 proceeds from operation 326 to operation 330, where the simple boot flag testing module 146 temporarily stores data indicating that this test has passed. If, however, the read value of the simple boot flag data structure 144 is any value other than 07h, the routine 300 proceeds from operation 326 to operation 328, where the simple boot flag testing module 146 temporarily stores data indicating that this test has failed. From operations 328 and 330, the routine 300 proceeds to operation 332.

At operation 332, the simple boot flag testing module 146 sets the simple boot flag data structure to 85h (binary 1000 0101). Setting the simple boot flag data structure to 85h allows the simple boot flag testing module 146 to test the functionality of the simple boot flag processing module 142 for handling the case where bits 202B and 202C of the simple boot flag data structure 144 indicate that the previous boot of the computer 100 was completed but that a problem was detected.

From operation 332, the routine 300 proceeds to operation 334, where the simple boot flag testing module 146 causes the computer 100 to reboot. Once the computer 100 has rebooted, the routine 300 proceeds to operation 336, where the simple boot flag testing module 146 reads the value of the simple boot flag data structure 144 and compares the read value to the value 83h (binary 1000 0011). If the read value of the simple boot flag data structure 144 is 83h, the routine 300 proceeds from operation 336 to operation 320, where the simple boot flag testing module 146 temporarily stores data indicating that this test has passed. If, however, the read value of the simple boot flag data structure 144 is any value other than 83h, the routine 300 proceeds from operation 336 to operation 338, where the simple boot flag testing module 146 temporarily stores data indicating that this test has failed. From operations 338 and 340, the routine 300 proceeds to operation 342.

At operation 342, the simple boot flag testing module 146 sets the simple boot flag data structure to 07h (binary 0000 0111). Setting the simple boot flag data structure to 07h allows the simple boot flag testing module 146 to test the functionality of the simple boot flag processing module 142 for handling the case where bits 202B and 202C of the simple boot flag data structure 144 indicate that the previous boot of the computer 100 was not completed and that a problem with the computer 100 was detected.

From operation 342, the routine 300 proceeds to operation 344, where the simple boot flag testing module 146 causes the computer 100 to reboot. Once the computer 100 has rebooted, the routine 300 proceeds to operation 346, where the simple boot flag testing module 146 reads the value of the simple boot flag data structure 144 and compares the read value to the value 07h (binary 0000 0111). If the read value of the simple boot flag data structure 144 is 07h, the routine 300 proceeds from operation 346 to operation 350, where the simple boot flag testing module 146 temporarily stores data indicating that this test has passed. If, however, the read value of the simple boot flag data structure 144 is any value other than 07h, the routine 300 proceeds from operation 346 to operation 348, where the simple boot flag testing module 146 temporarily stores data indicating that this test has failed. From operations 348 and 350, the routine 300 proceeds to operation 352.

Figure 4:
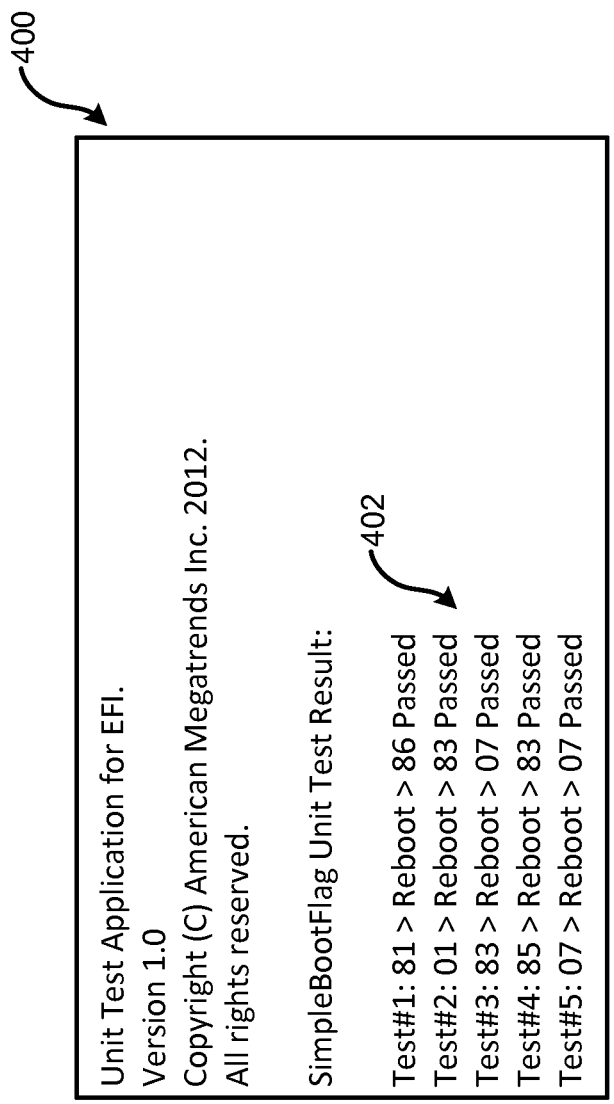
FIG. 4 is a user interface diagram showing one illustrative user interface for presenting the results of an automated test of program code for processing a simple boot flag data structure.

At operation 352, the simple boot flag testing module 146 retrieves the data stored at operations 308, 310, 318, 320, 328, 330, 338, 340, 348, or 350 and utilizes the stored data to present a user interface showing the results of the tests performed by the routine 300. FIG. 4 is a user interface diagram showing one illustrative user interface 400 for presenting the results 402 of the testing performed by the simple boot flag testing module 146 in the manner described above. Other types of user interfaces showing other types of information might also be utilized in other embodiments. Once the results of the testing of the simple boot flag processing module 142 has been presented, the routine 300 proceeds from operation 352 to operation 354, where it ends. The results of the testing described above might then be utilized to identify errors in the program code of the simple boot flag processing module 142.

It should be appreciated that, in some embodiments, the simple boot flag testing module 146 might not perform all of the tests described above with regard to FIG. 3. Similarly, in other embodiments, the simple boot flag testing module 146 might be configured to perform different or additional tests than those described above with regard to FIG. 3. For example, the simple boot flag testing module 146 might be configured to test processing of bit 202A and/or bit 202E of the simple boot flag data structure 144 in other embodiments.

Based on the foregoing, it should be appreciated that technologies for the automated testing of program code for processing a simple boot flag data structure 144 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for testing program code for processing a simple boot flag data structure stored on a computer, the method comprising performing computer-implemented operations for:

setting the simple boot flag data structure to a first value that indicates one or more actions for firmware of the computer to perform during a next boot of the computer, the one or more actions for firmware of the computer to perform during the next boot of the computer selected from a plurality of boot options and wherein the one or more actions are used for testing the program code for processing the simple boot flag data structure;

causing the computer to perform the next boot of the computer by rebooting after the simple boot flag data structure has been set to the first value;

following the reboot of the computer, determining if the simple boot flag data structure is equivalent to a second value;

in response to determining that the simple boot flag data structure is not equivalent to the second value following the reboot of the computer, storing data indicating that testing of the program code for processing the simple boot flag data structure has failed;

utilizing the stored data to present results of the testing of the program code for processing the simple boot flag data structure; and repeating the setting, rebooting, determining, and storing operations for one or more other first and second values that are different from the first and second values prior to presenting the results of the testing.

2. The computer-implemented method of claim 1, wherein the first value comprises 81 hexadecimal and the second value comprises 86 hexadecimal.

3. The computer-implemented method of claim 1, wherein the first value comprises 01 hexadecimal and the second value comprises 83 hexadecimal.

4. The computer-implemented method of claim 1, wherein the first value comprises 83 hexadecimal and the second value comprises 07 hexadecimal.

5. The computer-implemented method of claim 1, wherein the first value comprises 85 hexadecimal and the second value comprises 83 hexadecimal.

6. The computer-implemented method of claim 1, wherein the first value comprises 07 hexadecimal and the second value comprises 07 hexadecimal.

7. The computer-implemented method of claim 1, wherein the program code for processing the simple boot flag data structure comprises a module in the firmware that is compatible with the Unified Extensible Firmware Interface (UEFI) specification.

8. The computer-implemented method of claim 1, wherein the program code for processing the simple boot flag data structure comprises a module in a legacy Basic Input and Output System (BIOS) firmware.

9. A non-transitory computer-readable storage medium having computer-executable instructions stored thereupon which, when executed by a computer, cause the computer to:

store a first value in a simple boot flag data structure stored by the computer that indicates one or more actions for the computer to perform during a next boot of the computer, the one or more actions for the computer to perform during the next boot of the computer selected from a plurality of boot options;

cause the computer to perform a reboot operation following the storage of the first value in the simple boot flag data structure;

following the completion of the reboot operation, determine if the simple boot flag data structure is equivalent to a second value;

present an indication that a test of a program for processing the simple boot flag data structure has failed in response to determining that the simple boot flag data structure is not equivalent to the second value following the completion of the reboot operation; and repeat the storage of the first value, the reboot operation, and determine if the simple boot flag is equivalent to the second value operations for one or more other first and second values that are different from the first and second values following the completion of the reboot operation prior to the presenting.

10. The non-transitory computer-readable storage medium of claim 9 having further computer-executable instructions stored thereupon which, when executed by the computer, cause the computer to present an indication that a test of the program for processing the simple boot flag data structure has passed in response to determining that the simple boot flag data structure is equivalent to the second value following the completion of the reboot operation.

11. The non-transitory computer-readable storage medium of claim 9, wherein the first value comprises 81 hexadecimal and the second value comprises 86 hexadecimal.

12. The non-transitory computer-readable storage medium of claim 9, wherein the first value comprises 01 hexadecimal and the second value comprises 83 hexadecimal.

13. The non-transitory computer-readable storage medium of claim 9, wherein the first value comprises 83 hexadecimal and the second value comprises 07 hexadecimal.

14. The non-transitory computer-readable storage medium of claim 9, wherein the first value comprises 85 hexadecimal and the second value comprises 83 hexadecimal.

15. The non-transitory computer-readable storage medium of claim 9, wherein the first value comprises 07 hexadecimal and the second value comprises 07 hexadecimal.

16. A computing device, comprising:
a central processing unit; and
a memory device storing
a simple boot flag data structure,
a simple boot flag processing module configured to process the simple boot flag data structure, and
a simple boot flag testing module configured to test the operation of the simple boot flag processing module by
storing a first value in the simple boot flag data structure that indicates one or more actions for the computing device to perform during a next boot of the computing device, the one or more actions for the computing device to perform during the next boot of the computing device selected from a plurality of boot options;
causing the computing device to perform a reboot operation following the storage of the first value in the simple boot flag data structure,
following completion of the reboot operation, determining if the simple boot flag data structure is equivalent to a second value,
presenting an indication that a test of the simple boot flag processing module has failed in response to determining that the simple boot flag data structure is not equivalent to the second value following completion of the reboot operation; and
repeating the storing, rebooting, and determining if the simple boot flag data structure is equivalent to the second value operations, for one or more other first and second values that are different from the first and second values following the completion of the reboot operation prior to the presenting.

17. The computing device of claim 16, wherein the simple boot flag testing module is further configured to present an indication that the test of the simple boot flag processing module has passed in response to determining that the simple boot flag data structure is equivalent to the second value following completion of the reboot operation.

18. The computing device of claim 16, wherein the first value comprises 81 hexadecimal and the second value comprises 86 hexadecimal.

19. The computing device of claim 16, wherein the first value comprises 01 hexadecimal and the second value comprises 83 hexadecimal.

20. The computing device of claim 16, wherein the first value comprises 83 hexadecimal and the second value comprises 07 hexadecimal.

21. The computing device of claim 16, wherein the first value comprises 85 hexadecimal and the second value comprises 83 hexadecimal.

22. The computing device of claim 16, wherein the first value comprises 07 hexadecimal and the second value comprises 07 hexadecimal.

\* \* \* \* \*